United States Patent Office 3,316,214
Patented Apr. 25, 1967

3,316,214
SOLUBLE ANIONIC (METHYLENEDIPHENYL
ETHER) POLYMERS
Gerald R. Geyer, Midland, Mich., assignor to The Dow Chemical Company, Midland, Mich., a corporation of Delaware
No Drawing. Filed May 14, 1964, Ser. No. 367,575
9 Claims. (Cl. 260—47)

This invention concerns new soluble functional polymers having functional anionic groups chemically bonded to a (methylenediphenyl ether) polymer. More specifically it relates to soluble derivatives of (halomethyldiphenyl ether) polymers characterized by a plurality of (methylenediphenyl ether) moieties of the formula:

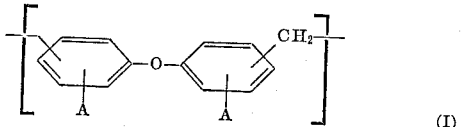

(I)

wherein each A individually is a member of the group consisting of —H, —R, and —CH$_2$R; R is an anionic moiety containing a sulfonic, carboxylic, phosphonic or phosphinic acid group; and the (methylenediphenyl ether) moieties containing an average of at least 0.05 functional anionic groups (R).

These new and useful soluble functional anionic polymers are advantageously, prepared by chemical modification of a soluble poly (chloromethyldiphenyl ether) by direct substitution of a functional anionic group, such as a sulfonic or phosphonic acid group, on the aromatic nuclei of the polymer. Functional anionic polymers can also be prepared by introduction of sulfonic acid, amino acid, carboxylic acid, thiol acid and similar functional anionic moieties through reactions of residual chloromethyl or halomethyl groups of a soluble (halomethyldiphenyl ether) polymer.

The varied physical and chemical properties of these soluble functional anionic polymers bestow on them a broad range of utility as thickeners, dispersants, flocculants, and chelating agents. Since the polymer matrix is particularly resistant to thermal and oxidative attack, these anionic polymers have enhanced chemical and thermal stability. Furthermore, because these soluble anionic polymers can be prepared from readily available materials, there are important and significant process advantages and economies in their production and use.

SOLUBLE INTERMEDIATE POLYMERS

In practicing the present invention, a soluble polymer comprising in major molar proportion a plurality of moieties of the formula:

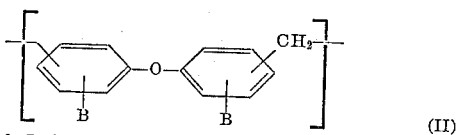

(II)

wherein each B individually is H, —CH$_2$Cl or —CH$_2$Br, is employed as a matrix to which the anionic groups are chemically bonded. Particularly desirable as intermediate polymers herein are the soluble (methylenediphenyl ether) polymers obtained by a controlled condensation polymerization of chloromethyldiphenyl ether and similar reactive diphenyl ether derivatives as described by Geyer, Hatch and Smith in the pending U.S. patent application S.N. 299,073 filed July 31, 1963. These soluble (methylenediphenyl ether) polymers are essentially linear polymers which can be prepared, by appropriate choice of reactants, to have from less than 0.1 to about 2.0 residual halomethyl groups per diphenyl ether moiety. As further described by Geyer, Hatch and Smith, these essentially linear polymers are soluble in methylene chloride, carbon tetrachloride, toluene and similar nonpolar solvents. However the hydrophobic nature of these soluble intermediate polymers is altered by the anionic substituents. For example, addition of about 0.3 or more sulfonic acid groups per diphenyl ether moiety converts the intermediate polymer into a water-soluble derivative that is dispersible in water to give a visually homogeneous and transparent solution infinitely dilutable with water. While the precise solubility characteristics, of course, depends on the degree of substitution and the structure of the substituents, the soluble anionic polymers described herein having at least 0.3 functional groups per diphenyl ether moiety are generally soluble in water, aqueous alcohol, aqueous acetone and similar polar solvents. With a lower degree of substitution and less hydrophilic substituents, the solubility characteristics resemble those of the intermediate (methylenediphenyl ether) polymers.

NUCLEAR-SUBSTITUTED ANIONIC
DERIVATIVES

To prepare an anionic polymer having the functional group directly substituted on the aromatic ring, as for example a sulfonic acid derivative prepared as shown in Equation 1:

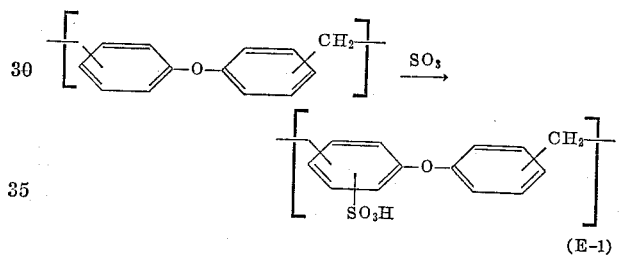

(E-1)

it is desirable to use an intermediate soluble (methylenediphenyl ether) polymer having a low residual halomethyl content. With an intermediate polymer having less than 0.1 halomethyl groups per diphenyl ether moiety, soluble polymers having up to about 2 anionic substituents per diphenyl ether moiety can be prepared. It is difficult to obtain a higher degree of direct substitution without extensive cross-linking and insolubilization.

While the intermediate soluble (methylenediphenyl ether) polymer can be sulfonated with conventional reagents such as concentrated sulfuric acid or chlorosulfonic acid, extreme care must be used to minimize cross-linking. A preferred sulfonation process is that described by A. F. Turbak in United States Patent 3,072,618 wherein a SO$_3$-phosphate complex is utilized as the sulfonating agent. When used with an intermediate (methylenediphenyl ether) polymer containing less than 0.1 chloromethyl groups per diphenyl ether moiety, the Turbak process provides rapid sulfonation with a minimum of cross-linking giving a soluble anionic polymer having an average of up to about 2 sulfonic groups per diphenyl ether moiety. Sulfonic acid derivatives containing more than about 0.3 sulfonic groups per diphenyl ether moiety are usually completely water-soluble. Furthermore salts obtained by neutralizing the sulfonic acid with ammonia, sodium hydroxide, potassium carbonate, water-soluble organic amines and similar monovalent bases are also generally water-soluble.

Still other useful nuclear-substituted anionic derivatives are obtained by reaction of an intermediate soluble (methylenediphenyl ether) polymer with phosphorus trichloride in the general manner of McMaster and Glesner in U.S. Patent 2,764,563 thereby introducing nuclear phosphonic or phosphinic substituents.

SIDE CHAIN ANIONIC DERIVATIVES

Functional anionic polymers can also be prepared by introduction of sulfonic acid, amino acid, carboxylic acid, or thiol acid moieties through reaction of residual halomethyl groups of a soluble intermediate (halomethyldiphenyl ether) polymer as illustrated in Equation 2:

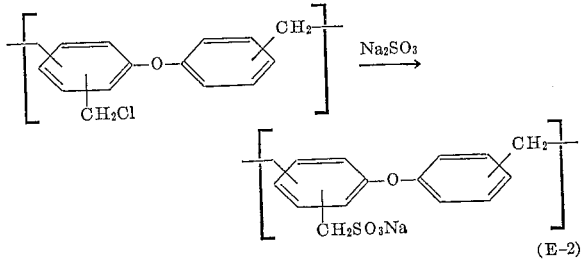

(E-2)

To achieve a high anionic content it is particularly desirable to employ an intermediate (halomethyldiphenyl ether) polymer having a high residual chloromethyl content, preferably an average of from 1.2 to 2.0 chloromethyl groups per diphenyl ether moiety.

Many different soluble anionic derivatives can be prepared in this manner by reaction of residual halomethyl groups with appropriate functional reagents to replace the halogen with a substituent group containing a sulfonic or carboxylic acid moiety. Suitable functional reagents are further characterized by: (1) being soluble to the extent of at least 5 wt. percent in a polar hydroxylic solvent such as water, alcohol, ethylene glycol and mixtures thereof, (2) reacting with a stoichiometric amount of benzyl chloride at 20° to 100° C. to displace at least 5 mole percent of the chloride therefrom in 48 hours, and (3) having a sulfonic or carboxylic acid moiety or a group convertible thereto by simple hydrolysis. When incorporated in an insoluble resinous matrix, these functional anionic groups give cation and chelate exchange resins.

Representative of the varied functional reagents which can be used to prepare the anionic polymers described herein through reaction with a substituent halomethyl group are: inorganic salts such as sodium cyanide, potassium thiocyanide, sodium sulfite; metal salts of active methylene compounds such as sodium acetoacetic acid and sodium malonitrile; amino- and thioacids such as glycine, iminodiacetic acid, phenylalanine, mercaptosuccinic acid and glycollic acid and salts thereof; aminonitriles and diethylaminoacetonitrile, etc.

At times, reaction of the intermediate soluble (halomethyldiphenyl ether) polymer with a desired reagent is complicated by opposing solubility characteristics. Particularly troublesome is the incompatibility encountered between the intermediate polymer and a hydrophilic reagent such as sodium iminodiacetate. This difficulty can be circumvented, however, by the general method described by M. J. Hatch in Canadian Patent 646,232 and illustrated in Equation 3 wherein Ar is a (methylenediphenyl ether) moiety:

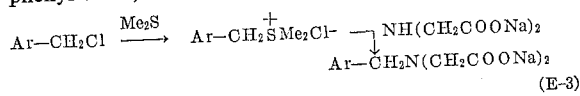

(E-3)

This sulfonium process is particularly useful in the synthesis of soluble (methylenediphenyl ether) polymers containing iminodiacetate or mercaptoacetate groups. Since the intermediate sulfonium salts are generally soluble in water, aqueous alcohol, ethylene glycol and similar hydroxylic solvents, these solvents are desirable in reacting the salts with the functional reagents. However, because of the diverse nature of the reactants, no one solvent or process will be optimum for all systems. Judicious choice must be made based on the properties of the reactants and may be confirmed by simple tests.

In summary, by appropriate chemical modifications of a soluble intermediate (methylenediphenyl ether) polymer, valuable anionic polymers are obtained. While these new polymers conveniently are obtained and used in the sodium salt form, other salts derived from monovalent water-soluble bases can also be used. The polymers can be interconverted from one salt form to another or to the free acid form by standard ion exchange techniques. These products have excellent chemical and thermal stability. They are useful in a variety of applications but particularly as flocculants, thickeners, dispersants, and metal deactivators in aqueous systems.

The following examples illustrate further the invention described herein, but are not to be construed as limiting its scope. Unless otherwise specified, all parts and percentages are by weight.

*Example 1.—Intermediate (methylenediphenyl ether) polymers*

A. To a stirred solution of 2630 parts of chloromethyldiphenyl ether containing 31.5 wt. percent chlorine, an average of 2.70 chloromethyl groups per diphenyl ether moiety ($ClCH_2$—/DPE), and 2630 parts of 1,2-dichloroethane was added 16 parts of a 50 percent solution of anhydrous zinc chloride in methanol. After heating the reaction mixture at 65–70° C. for 21 hours, and then washing with water to remove the catalyst and dissolved HCl, there was obtained 3453 parts of a polymer solution containing 67.2 percent solids. A sample of the soluble poly(chloromethyldiphenyl ether) isolated by precipitation with excess methanol, was found to contain 21.7 wt. percent side chain chlorine or an average of about 1.60 residual $ClCH_2$—/DPE.

B. Polymerization in a similar manner of a chloromethyldiphenyl ether containing 17.6 wt. percent chlorine (1.12 $ClCH_2$—/DPE) gave a soluble intermediate (methylenediphenyl ether) polymer containing less than 2 wt. percent side chain chlorine or an average of less than 0.1 residual $ClCH_2$—/DPE.

C. Likewise a variety of other chloromethyldiphenyl ethers having an average of from about 1.0 to 3.0

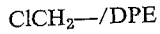

can be polymerized to give soluble (methylenediphenyl ether) polymers having an average from about 0.05 to 2.0 residual $ClCH_2$—/DPE.

*Example 2.—Sulfonic acid polymer*

A. To a stirred solution of 184 parts (1 mole DPE content) of the soluble (methylenediphenyl ether) polymer described in Example 1B dissolved in 3700 parts of 1,2-dichloroethane and cooled in an ice bath, was added slowly in about 15 minutes a solution of 312 parts (1.7 moles) of triethylphosphate and 202 parts (2.5 moles) of $SO_3$ the temperature being held below 10° C. during the addition. The ice bath was removed and the light red solution stirred for another hour as the hazy mixture warmed slowly to room temperature. Then it was neutralized with excess 50 percent sodium hydroxide and the slightly cloudy aqueous product phase separated. Dilution with additional water gave a visually homogeneous solution containing about 10 percent polymer solids.

A sample of the sulfonated polymer was precipitated by dilution of a portion of the aqueous solution with acetone. The resulting white solid polymer was insoluble in methanol, but readily redissolved in water. Although the solid polymer was contaminated with inorganic salts, it was estimated from elemental analyses for carbon, hydrogen, sulfur and sodium that the polymer contained an average between about 1.5 and 2 sulfonic acid moieties/DPE group. Using conventional ion exchange techniques with a strong acid resin in the hydrogen form, the soluble polymer is converted to the free acid form.

B. To test the utility of the sulfonated polymer as a dispersant for titanium dioxide pigment in latex paints, successive increments of a 6.5 percent aqueous solution of the polymer described in Example 2A in sodium form, was added to a thick pasty grind of 300 parts of titanium dioxide pigment and 200 parts of water until the grind was converted to a fluid dispersion which spread smoothly without lumps when poured onto a glass plate. With the sulfonated polymer about 55 parts of the aqueous solution was required to achieve the desired dispersion, i.e., about 1 part of polymer/100 parts of pigment. In this test accepted commercial pigment dispersants are effective at about 0.3 to 0.7 part/100 parts of pigment.

*Example 3.—Iminodiacetate polymer*

A. A mixture of 200 parts of the soluble poly(chloromethyldiphenyl ether) described in Example 1A and containing 1.2 moles of —$CH_2Cl$, 300 parts of ethylene glycol diethyl ether, and 375 parts of 1,2-dichloroethane was heated to 40° C. and 96.2 parts (1.6 moles) of dimethyl sulfide added. After heating for 10 minutes at 40° C. the reaction mixture was diluted with 1000 parts of water added gradually over a period of 30 minutes. Finally the dichloroethane and excess dimethyl sulfide was stripped in vacuo at 40–50° C.

To 100 parts of the above aqueous solution containing about 25 parts of the dimethyl sulfonium salt (0.11 mole —$CH_2S^+$) was added a solution of sodium iminodiacetate prepared by dissolving 30 parts (0.22 mole) of iminodiacetic acid in about 100 parts of 20 percent sodium hydroxide. The resulting slightly hazy solution was then heated. At about 50° C. vigorous evolution of dimethyl sulfide occurred. After heating for 12 hours at 50–70° C., evolution of dimethyl sulfide ceased. Then to insure complete reaction, the mixture was held at 90–95° C. for about 10 hours. Dilution with water gave a 5–10 percent aqueous solution of the iminodiacetate polymer which is effective in deactivating copper and nickel ions in an aqueous solution.

By treating a portion of the polymer solution with dioxane, the solid iminodiacetate polymer was precipitated from solution. Although purification of the polymer is complicated by coprecipitation of excess sodium iminodiacetate, the infrared spectrum of the isolated polymer is consistent with the assigned structure. Elemental analysis of a polymer fraction purified by reprecipitation from water indicates an average of about 1 methyleneiminodiacetate group per diphenyl ether moiety.

*Example 4.—Other anionic polymers*

In a manner similar to that of Example 3, other anionic polymers are prepared by the reaction of soluble (chloromethyldiphenyl ether) polymers containing residual chloromethyl groups to replace the chlorine with a functional anionic group derived from sodium sulfite, sodium mercaptosuccinate and with sodium cyanide. On hydrolysis the cyano group gives the corresponding carboxylic acid. To achieve high yields and satisfactory conversion rates, an excess of the functional reagent is used with a reaction time of from 2 to 48 or more hours at a temperature between 50° and 100° C.

I claim:

1. A soluble functional anionic polymer comprising in major molar proportions a plurality of (methylenediphenyl ether) moieties of the formula:

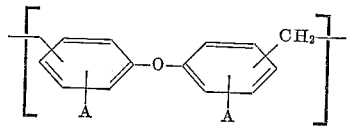

wherein
   each A individually is a member of the group consisting of —H, —R, and —$CH_2R$;
   R is an anionic moiety containing a functional group selected from the class consisting of —$SO_3M$, —COOM, —$PO_3M_2$ and —$HPO_2M$ wherein M is a monovalent cation; and
   the (methylenediphenyl ether) moieties contain an average of at least 0.05 anionic groups (R).

2. The soluble anionic polymer of claim 1 wherein the anionic groups are sulfonic acid groups and monovalent cation salts thereof.

3. A water-soluble functional anionic polymer consisting essentially of a plurality of (methylenediphenyl ether) moieties having chemically bonded to the aromatic nuclei thereof an average of at least 0.3 anionic groups per (methylenediphenyl ether) moiety, said anionic groups being selected from the class consisting of —$SO_3M$, —$PO_3M_2$ and —$HPO_2M$ wherein M is a monovalent cation.

4. The water-soluble anionic polymer of claim 3 containing an average of about 0.3 to 2.0 sulfonic acid groups per (methylenediphenyl ether) moiety and monovalent cation salts thereof.

5. A water-soluble functional anionic polymer consisting essentially of a plurality of (methylenediphenyl ether) moieties having chemically bonded to the aromatic nuclei thereof an average of at least 0.3 substituents of the formula —$CH_2R$ per (methylenediphenyl ether) moiety, R being an anionic moiety containing a functional group selected from the class consisting of —$SO_3M$ and —COOM wherein M is a monovalent cation.

6. The water-soluble anionic polymer of claim 5 containing an average of about 0.3 to 2 substituent methyleneiminodiacetate groups per (methylenediphenyl ether) moiety.

7. The water-soluble anionic polymer of claim 5 containing an average of about 0.3 to 2 substituent methylenemercaptosuccinate groups per (methylenediphenyl ether) moiety.

8. The water-soluble anionic polymer of claim 5 containing an average of about 0.3 to 2 substituent methylenesulfonic acid groups per (methylenediphenyl ether) moiety.

9. The water soluble anionic polymer of claim 5 containing an average of about 0.3 to 2 substituent methylenecarboxylic acid groups per (methylenediphenyl ether) moiety.

No references cited.

WILLIAM H. SHORT, *Primary Examiner.*

M. GOLDSTEIN, *Assistant Examiner.*